F. D. VANDERBILT.
FERTILIZER DISTRIBUTER.
APPLICATION FILED FEB. 8, 1912. RENEWED MAR. 19, 1915.
1,366,709.
Patented Jan. 25, 1921.
2 SHEETS—SHEET 2.
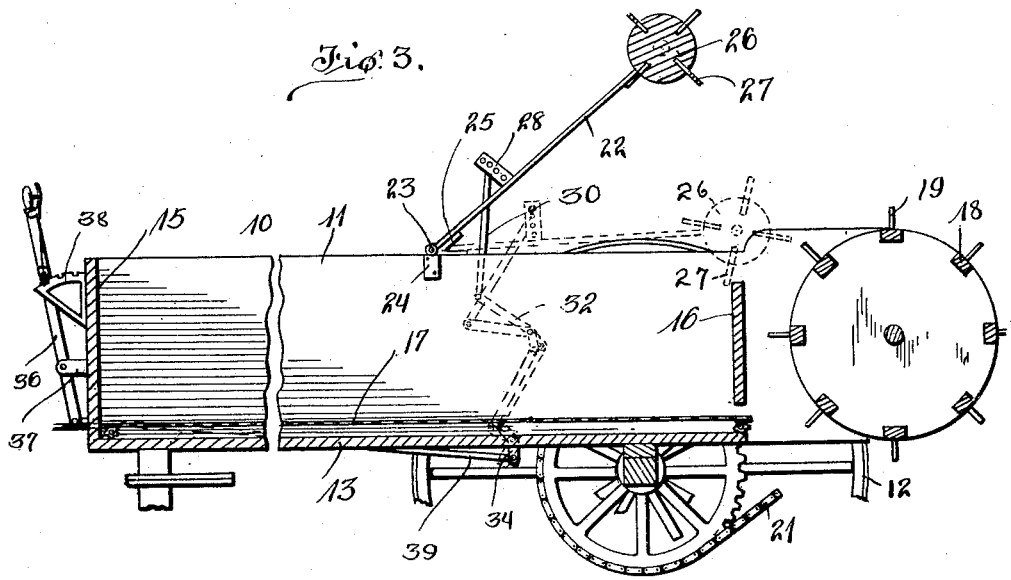
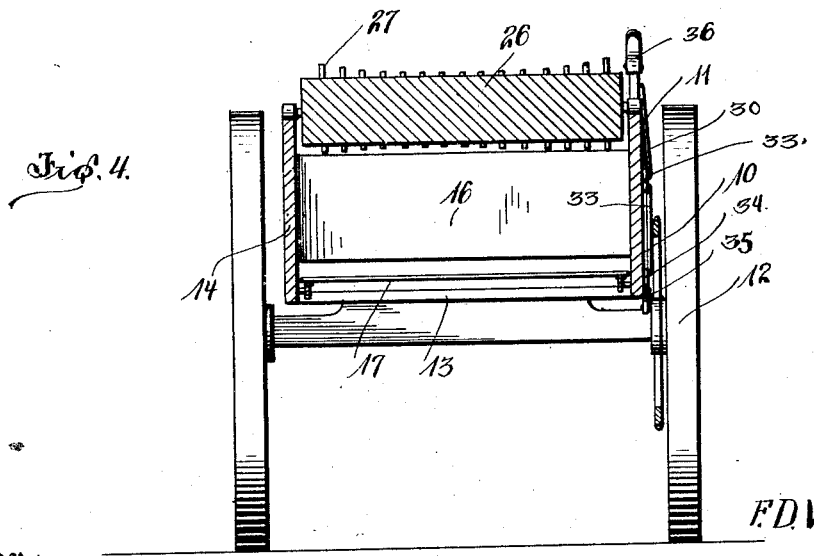

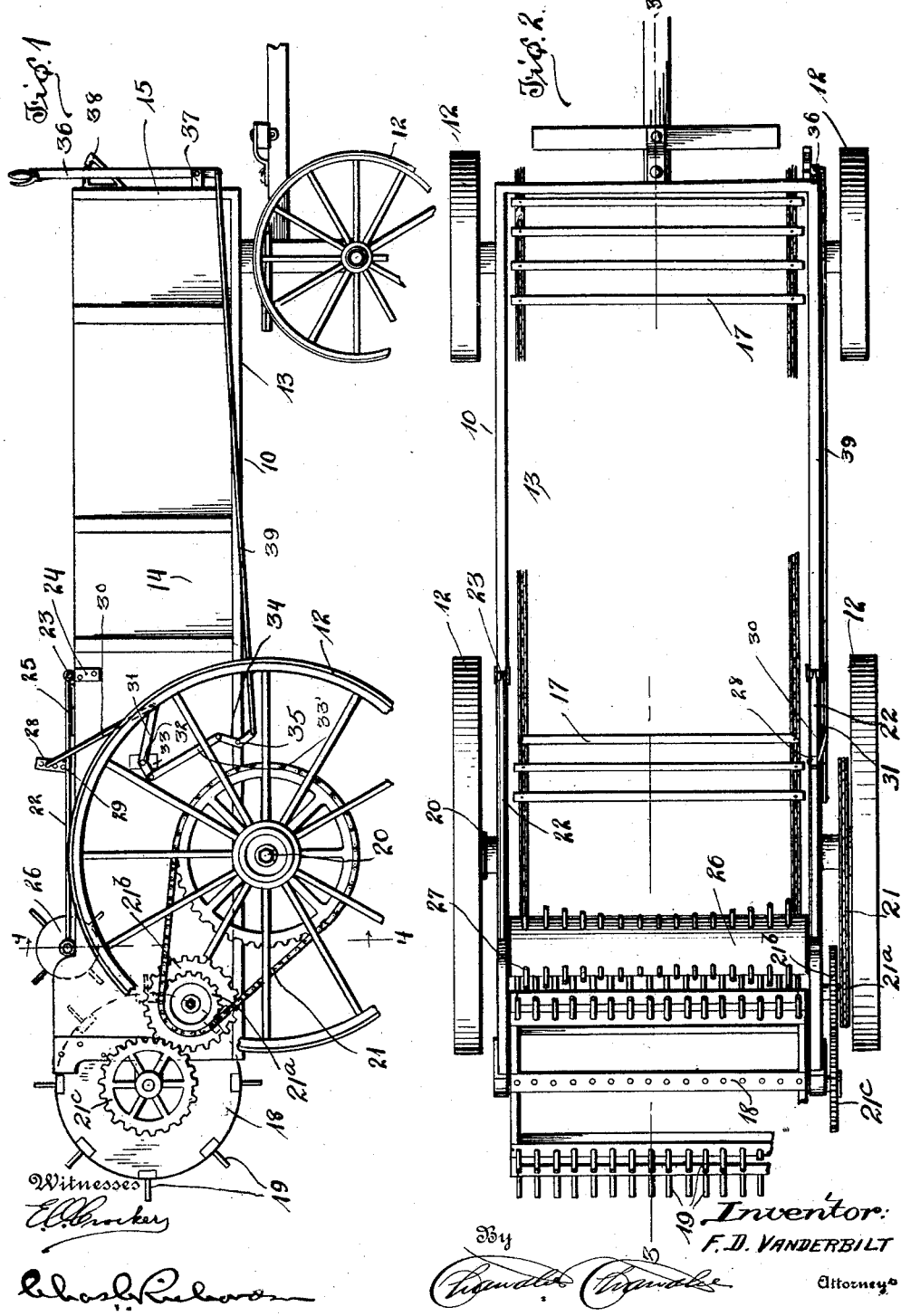

UNITED STATES PATENT OFFICE.

FARLEY D. VANDERBILT, OF SENECA FALLS, NEW YORK, ASSIGNOR, BY MESNE ASSIGNMENTS, TO DEERE & COMPANY, OF MOLINE, ILLINOIS, A CORPORATION OF ILLINOIS.

FERTILIZER-DISTRIBUTER.

1,366,709.  Specification of Letters Patent.  Patented Jan. 25, 1921.

Application filed February 3, 1912, Serial No. 676,278.  Renewed March 19, 1915.  Serial No. 15,576.

*To all whom it may concern:*

Be it known that I, FARLEY D. VANDERBILT, a citizen of the United States, residing at Seneca Falls in the county of Wayne, State of New York, have invented certain new and useful Improvements in Fertilizer-Distributers; and I do hereby declare the following to be a full, clear, and exact description of the invention, such as will enable others skilled in the art to which it appertains to make and use the same.

This invention relates to new and useful improvements in fertilizer distributers.

The object of this invention is the provision of a device such as described which is so constructed that the fertilizer will be evenly distributed by the usual distributing cylinder and prevented from being unevenly thrown over the ground in lumps.

A further object of this invention is the provision of a fertilizer distributer in which the distributing attachment may be held against displacement in either its operative or inoperative position.

A still further object of this invention is the provision of a fertilizer distributer which will be comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:

Figure 1 is a side elevation of my invention.

Fig. 2 is a top plan view thereof.

Fig. 3 is a longitudinal sectional view taken on the line 3—3 of Fig. 2 with the parts in inoperative relation in full lines and in operative relation in dotted lines, and Fig. 4 is a transverse sectional view taken on the line 4—4 of Fig. 1.

This fertilizer distributer comprises, generally, a body, a revoluble beater at the rear end of the body, a movable conveyer or bottom having a follower for pushing the load toward the beater, means for actuating the beater and the bottom, a comb revoluble by the feeding load in a direction opposite to the direction of rotation of the beater, and means supporting the comb and permitting the same to yield relatively to the beater and the feeding load.

Referring to the accompanying drawings by similar characters of reference throughout the several views, the numeral 10 designates generally a fertilizer distributer of the usual form comprising the customary body 11 which is mounted upon the usual supporting wheels 12.

The body 11 consists of a bottom 13 to the opposite longitudinal edges of which are secured the usual slides 14 closed at their forward ends by a front 15.

The usual conveyer 17 extends longitudinally of the body 11 and is operated in any suitable manner not shown in the drawings, and moved longitudinally of the body toward the beater by this conveyer, is the usual follower or feed-board 16. Journaled at the rear end of the sides 14 is the usual beater or distributing cylinder 18 provided with the customary distributing teeth 19. This distributing cylinder 18 is preferably driven from the rear axle 20 as indicated by the numeral 21 and gears $21^a$, $21^b$ and $21^c$.

A pair of spring supporting bars 22 are hingedly connected as indicated by the numeral 23 to plates 24 attached to the sides 14, and are normally forced to the position indicated by the full lines in Fig. 3 of the drawings, by springs 25 which are secured to the upper edges of the sides 14 adjacent the plates 24 and engage the underside of the said spring arms 22.

The rotating comb is here shown as a roller 26 journaled in the rear ends of the bars 22 and having projecting therefrom at diametrically opposite points, rows of teeth 27 which are gradually increased in length from the central portion of the said roller 26 toward the opposite ends.

A plate 28 is bolted or otherwise secured to one of the spring bars 22 at a point spaced between the intermediate portion thereof and its pivoted end, and is provided with a series of apertures 29 for adjustable connection with the upper end of the link 30 which is pivoted at its lower end to a bell crank lever 31 fulcrumed upon a shaft 32 which is carried by a plate 33 bolted or otherwise secured to one of the sides 14 of the spreader body 11.

The opposite arm of the bell crank lever 31 is connected by means of a link 33′ to one arm of a bell crank lever 34 pivoted to the adjacent side 14 of the body 11 preferably below the plate 33 as indicated by the numeral 35.

An operating lever 36 is journaled upon a forwardly extending bracket 37 secured to the forward end of the side 14 which supports the bell crank levers 31 and 34 and engages a segment 38, also secured to the said side 14, which holds the lever 36 in its various adjusted positions. The lower end of this lever 36 is pivotally connected to one arm of the bell crank lever 34 by an operating rod 39 which upon the forward movement of the said lever 36 causes the bell crank levers 31 and 34 to be operated which through the medium of the link 30 raise the spring arms 22 causing the roller 26 to be moved to its inoperative position shown in full lines in Fig. 3.

The operation of the device is as follows: The roller 26 is thrown to its inoperative position and the fertilizer piled into the body 11 upon the conveyer 17, the board 16 being then at the forward end of the body. The spreader is then propelled over the field causing the operation of the distributing cylinder and conveyer 17 in the usual manner. The material fed by the conveyer against the cylinder will be thrown out to the rear, the teeth 27 of the roller 26 serving to break the material up as it is lifted by the distributing cylinder. At the termination of the feeding movement of the board 16 same will coöperate with the teeth 27 of the roller 26 and momentarily lock said roller against rotation so that the lumpy material just in advance of the board 16 will be thoroughly crushed by the teeth 19 and 27 before same is delivered to the ground.

It should be understood in his connection that various minor changes in the details of construction may be resorted to within the scope of the appended claims without departing from or sacrificing any of the advantages of the invention.

From the foregoing disclosures taken in connection with the accompanying drawings it will be manifest that a fertilizer of the nature described is provided for which will fulfil all of the necessary requirements of such a device.

Having thus fully described this invention what I claim as new and desire to protect by Letters Patent, is:

1. In a fertilizer distributer, the combination of a beater and a revoluble idler comb, the lower portion of the comb projecting into the path of the traveling load when the comb is in operative position, spring means supporting the comb and normally holding the same in inoperative position, and manual means for moving the comb into operative position, substantially as and for the purpose described.

2. In a fertilizer distributer, the combination of a body, a beater, a revoluble idler comb movable into and out of position adjacent the beater, the lower portion of the comb projecting into the path of the traveling load when the comb is in operative position, and means supporting the comb including arms pivoted to the body and extending rearwardly from their pivots and carrying the comb at their rear ends, the arms being movable vertically on their pivots for carrying the comb into and out of position adjacent the beater, and means for moving the arms, substantially as and for the purpose specified.

3. In a fertilizer distributer, the combination of a body, a movable conveyer, a follower movable with the conveyer toward the rear end of the body, a beater at the rear end of the body, and a rotating comb movable into a position adjacent the beater and into the path of the follower, said comb being free to be locked from rotating movement during the movement of the beater, and said follower serving to engage and lock the rotating comb during the movement of the beater, substantially as and for the purpose specified.

4. In a fertilizer distributer, the combination of a beater, a rotating comb movable into and out of position adjacent the beater, means for feeding the load to the beater, and a part movable with said means for stopping the rotation of the comb as the feeding means approaches the limit of its feeding movement, substantially as and for the purpose specified.

5. In a fertilizer distributer, the combination of a wheeled body, a distributing cylinder at the rear of the body, a conveyer, a feed board operated longitudinally of the body by said conveyer, traction operated means for actuating the cylinder and conveyer, arms pivoted on said body, a toothed roller journaled between said arms at their free ends, spring means normally holding said arms in position to dispose the roller out of operative relation to the cylinder, means for moving said arms against the influence of said spring means to dispose the roller in operative relation to the cylinder and in position to effect engagement between the teeth thereof and the feed board during the final feeding movement of the latter.

In testimony whereof, I affix my signature, in presence of two witnesses.

FARLEY D. VANDERBILT.

Witnesses:
 EDW. LAWRENCE,
 ALBERT CULLEN.